United States Patent [19]

Cazalet

[11] 4,235,750

[45] Nov. 25, 1980

[54] CONTAINER FOR PREVENTION OF POSTHARVEST DECAY, MATURATION AND SENESCENSE OF HARVESTED CROPS

[76] Inventor: Michael F. Cazalet, 11603 Vanderford, Houston, Tex. 77099

[21] Appl. No.: 18,117

[22] Filed: Mar. 7, 1979

[51] Int. Cl.$^3$ .................... B01J 21/08; B01J 21/18; B01J 23/34; B01J 21/04
[52] U.S. Cl. .................... 252/446; 252/454; 252/455 R; 252/477 R; 426/419
[58] Field of Search ............ 252/477 R, 454, 455 R, 252/446; 426/419

[56] References Cited

U.S. PATENT DOCUMENTS

| 2,439,538 | 4/1948 | Burgess | 252/477 R |
| 4,113,652 | 9/1978 | Yoshikawa et al. | 252/429 R |

*Primary Examiner*—W. J. Shine
*Attorney, Agent, or Firm*—Gunn, Lee & Jackson

[57] ABSTRACT

The present disclosure is directed to, in its preferred and illustrated embodiment, both an apparatus and method which prevents postharvest decay, maturation and senescense. The apparatus is a structure which contains adsorbing and oxidizing materials which include activated carbon, finely ground to have a surface area of not less than 1450.0 square meters per gram, potassium permanganate impregnated by drying onto an activated alumina extrudate pellet or carrier, a molecular seive having a surface area of note less than 350.0 square meters per gram and a silica gel having a surface area of not less than approximately 850.0 square meters per gram.

One form of the apparatus is placement of granulated or particulate ingredients in cavities of a molded or extruded plastic framework open on two faces and covered by a heat sealed filter media having air-exposed pores of about 300.0 microns or larger to enable airborne particles and vapors to pass into the cavities. An alternate form is a pouch or pocket with ingredients in the pouch. The pouch is formed of porous paper or the like. The method and apparatus contemplate placing the respiring fruit near the specified materials as, for example, in a truck, refrigerator or the like.

8 Claims, 3 Drawing Figures

CONTAINER FOR PREVENTION OF POSTHARVEST DECAY, MATURATION AND SENESCENSE OF HARVESTED CROPS

BACKGROUND OF THE DISCLOSURE

Various perishable, harvested materials, including fruits and vegetables, pass through several changes which eventually terminate with full maturity, senescense or deterioration. Many of these changes continue after harvesting, namely, the time at which the fruit, vegetable or floral is severed from the living plant which brought it into being. Postharvest events particularly relate to the normal physiological evolution of the produce which is continued, at least in kind, if not quantity, originally from the natural energy source (the rooted plant), but which continues even after harvesting. In the beginning, there is cellular growth and expansion. These growth stages are described in many ways, one typical mode of description being found in Kreb's Cycle, relating to the conversion of starches to sugars. Other variables entering into the growth of a plant and, particularly, the fruit thereof include sunlight, moisture, nutrients derived from the soil, atmospheric constituents, pollution components regrettably in the air, chemical fertilizers and the like. These factors have a direct impact on the growth of the fruit preharvest which entails the multitudinous physiological changes that take place in the fruit. Many of these changes are keynoted by respiration of the perishable as physiological changes occur within, and this continues even after harvesting. It will eventually terminate only after passage of full maturity, perhaps subsequent decay or rotting, presuming that the fruit is not harvested in some usable fashion.

Factors which impact the development of the perishable during the initial stages are also important in typical postharvest circumstances. Without attempting to be too specific with regard to all fruits, vegetables and florals, there are three relatively common factors which come into play in maintaining continued quality of the perishable after it has been harvested. These three factors in all relate to the interplay between the harvested perishable and the nearby atmosphere. The factors are the respiration rate of the fruit, the ambient temperature and the ambient relative humidity. All factors are interdependent on one another. While a general rule cannot be developed which will describe the relationship of these three variables to all perishables, and, indeed, different perishables may act in contrary fashion to other perishables, the generalization nevertheless remains true that these factors are important in the postharvest deterioration, through maturing, senescenese or deterioration, of the invitation of mold or fungi development.

There exists for a typical perishable optimum conditions of respiration rate, temperature and relative humidity in postharvest conditions which will enable the fruit, vegetable or floral to delay or avoid the onset of decay, premature deterioration or premature maturation.

In postharvest conditions, respiration of the perishable permits various hydrocarbon gases to escape from the perishable Interestingly, some of the evolved gases either accelerate or delay aging, mold or fungi development of the perishable. The gases are relatively complex, being a mixture of many specific gases, but, in the main, carbon dioxide is notably present, and the most important evolved gas is ethylene. Ethylene is, thus, emitted from a postharvest perishable and is further a ripening hormone and, therefore, plays a specific role in postharvest perishable deterioration and decay. The present disclosure is concerned with evolved ethylene, not ethylene from petrochemical processing plants or naturally occurring ethylene from other sources. The ethylene of interest is that which is naturally synthesized within a perishable and which flows through the permeable surface of the perishable. Sometimes, the ethylene will materialize from the very beginning of the life of the fruit, and, in other instances, it will occur only after various precursors have occurred. A typical, although not singular, precursor is methionine. Other precursors occurring within the perishable include lanolinic acid, fructose, acidaldehyde, pyruvic acid and others.

It has been documented by various projects investigating the impact of ethylene on postharvest perishables that ethylene can readily initiate ripening, exudation, budding, root elongation (as in tubers), abscission, chlorophyll degradation, degreening, spore germination, alteration of pollination and other responses in a variety of perishables in preharvest circumstances. The quantity of ethylene (on a basis of ethylene evolved per kilogram of perishable material) is, in large part, a function of ambient air temperature and air relative humidity. It is also, of course, a function of the genus and species of the plant in question. Accordingly, some plants are high sensitive to very minute concentrations of ethylene which will trigger an ethylene-related response, while other plants are more highly tolerant to concentrations of ethylene in the near atmosphere. It is believed that there must be actual impingement on the fruit of the ethylene to initiate the actions which are referenced here.

Other factors impact the trace quantity of ethylene required to initiate a given response in a specific perishable. A variety of these factors include whether or not the plant, itself, is healthy, whether or not it has damaged or decaying tissue, the presence or absence of insect damage and so on. Another important factor is the amount of carbon dioxide in the air. Carbon dioxide is something of a deterrent to ethylene production within the perishable and, hence, ethylene respiration in the near atmosphere around the perishable. An increase in the carbon dioxide level lowers the ethylene level; the reverse is also true within specified limits. It might be further noted that another important variable is the classification of the perishable as a climacteric or nonclimacteric perishable. As a result of these highly interconnected variables for a given perishable, the ethylene respiration is not fixed, but is a variable which is at least typically peaked and subject to a decline, otherwise. As ethylene gas is respirated towards a peak flow rate from an ultimately mature fruit, it is accompanied by internal deterioration of the perishable. This is made visible on the exterior by, perhaps, breaks in the skin, shriveling on the surface, discoloration or markings on the peel and the like. This may also be accompanied by decay organisms which are deployed at or near damaged areas. Indeed, an aging perishable suffers from enhanced development of mold and fungi at the damaged tissue as a function of ethylene concentration. More importantly, once mold and fungi begin to form, they initiate the production of even more ethylene so that the process becomes a runaway whereby additional ethylene respiration compounds the already initiated aging process. These facts are believed to be well documented by researchers who have established that there is a direct correlation between the maturity of perishables and the propensity of decay organisms to develop and particularly so during the late maturity stages.

The above sequence can be described as, in part, dependent on two factors which are (1) the prevention or retardation of the maturing process of the perishable, and (2) alteration of the natural or near atmosphere conditions to discourage decay and decline.

The present invention is able to control concentrations of respiration gases in the near atmosphere of perishables in postharvest conditions. It is accomplished in light of the typical commercial circumstances of handling various harvested materials. Harvested produce, including fruits, vegetables and florals, are customarily boxed and then shipped in closed cargo containers. In many instances, they may be refrigerated, but this does not detract from the fact that they comprise a closed and often sealed container. It is customary in the fresh produce industry to utilize vented wooden crates, slotted fiber or cardboard boxes or other equivalent packaging. Occasionally, types of bags, including insulated or wax-coated bags, will be used, and these have absolutely a minimum of circulation or ventilation capacity. It has been noted that the particular mode of packaging will vary, and it depends on the nature of the crop in question. In any case, postharvest fruit, vegetables and florals have a specific time interval permitted before the perishable product is in danger. This time is shortened by meager ventilation. Ventilation, however, is very difficult in some circumstances where the container is a closed bag with no ventilation. Ventilation is not very good either in a closed freight car, with or without air conditioning equipment. The question of ventilation cannot be decided by considering evolution of ethylene gases, only. In other words, the near atmosphere concentration of ethylene gas is very important, but that factor cannot be dealt with singly. As an example, many postharvest fruits, vegetables or florals require a closed system which captures and maintains substantial moisture in the air to have high moisture content within the fruit. This is necessary to prevent dehydration. Thus, many produce products must be shipped in closed or nonventilated boxes. In that instance, cooling the air does not dry the air or reduce the moisture content near the product.

As a consequence of the foregoing factors, more often than not, postharvest perishables are shipped utilizing storage and shipping containers which may be described as closed systems. Very few exceptions occur, but they include such things as cantaloupe and watermelons, which can be shipped in open trucks. They are, however, characterized by very thick skin or rind. A closed system is typified by cold storage room, a closed truck with or without refrigeration equipment, freight cars, banana boats, air freight containers and the like. During both shipping and storage, the closed nature of the system constrains the variables mentioned above, namely, respiration, temperature and relative humidity. This creates short and long-term problems. Inevitably, the respiration and transpiration of the postharvest perishable continues substantially unabated. Because the respiration occurs within a closed container system, the evolved gases from the perishable are captured and accumulate. Because an accumulation of ethylene occurs, and further because ethylene, carbon dioxide and other typical evolved gases are immediately nearby, and further in light of the stimulative effect thereof, the metabolism rate of the perishable is typically accelerated. This has many manifestations. An exemplary manifestation is achieved in a cold storage room holding mature, green tomatoes, along with other ethylene-emitting perishables. The ethylene produced by other products will induce a maturing response in the green tomatoes which will accomplish a color change which, perhaps, is undesirable in the green tomatoes.

The example mentioned above is not a limitation on the problem. The problems encountered in closed system storage of perishables are broader and more difficult than would be implied by the example cited above. More importantly, laboratory tests and actual field conditions have indicated that the associated decay, fungi or mold development are manifestations which typically require either culling and quick conversion of the product or destruction of the entire cargo should the senescense proceed beyond a specified point. This has been combated by various systems known heretofore in the literature, and it is further combated through the use of more expensive, high speed transportation techniques. High speed transportation inevitably costs more money than slow speed transportation. The present invention, in large part, overcomes these problems and particularly provides a means and apparatus which can be tailored to combat the evolution of gases from maturing produce in a closed system, or elsewhere. The present apparatus and method adsorb, oxidize and filter out certain airborne contaminants to thereby avoid ideal conditions for accelerated maturity and senescense, coupled with a suppression of decay, mold and fungi development.

The disclosure herein describes a compartmentalized air filtration apparatus ideally used in the immediate or adjacent atmosphere of a closed or open container of perishables. The perishables, subject to normal metabolic or physiological maturation, typically involve hydrocarbon gases which remain in the immediate near atmosphere momentarily. This invention reduces the concentration of these gases to a specified level, thereby impeding maturation and senescense of the produce. The disclosed apparatus thus comes in a multiplicity of sizes, ideally, a small packet for placing in a cardboard carton of produce and a larger construction to be placed in a larger container.

DETAILED DESCRIPTION OF THE PREFERRED EMBODIMENT

Figure 1:
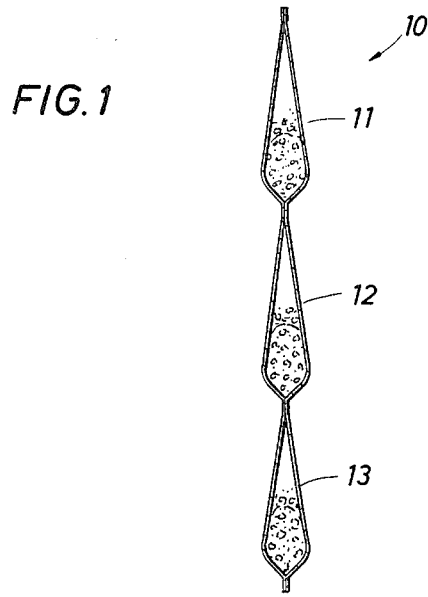
FIG. 1 is a side view of a packet made of heat sealed, porous paper which contains ingredients for protection of produce.

The present apparatus utilizes a preferred material which is a potassium permanganate (USP food grade) aqueous solution impregnated onto an activated alumina substrate. Beginning with the substrate, it is a granular material, perhaps having the form of a rod of about 1.0 to 2.0 millimeters in diameter and cut to a specified length in the range of just a few millimeters.

Pellets or balls having a diameter of about 2.0 to about 5.0 millimeters are acceptable. Ideally, it has a surface area of at least 350.0 square meters per gram of material, or greater. Through the use of deionized water at elevated temperatures (in the range of 40.0 degrees C. and up), potassium permanganate is dissolved in the water, and the solution is then sprayed, brushed or otherwise applied to the activated alumina substrate to be absorbed onto the surface of the substrate. One pound of the permanganate is dissolved in one gallon of water. The concentration of potassium permanganate in water is preferably limited to the stated ratio. If more is dissolved, the pores of the substrate will be clogged, reducing its oxidizing capacity. As a practical matter, exceeding this limit encounters the problem of dissolving all of the potassium permanganate. Falling short of this limit, there is simply more water involved than might be necessary. The solution can be dilute from the maximum suggested above. Water is simply a diluent which will eventually be evaporated, and, therefore, it is not meaningful except as a vehicle for application of the potassium permanganate to the basic alumina substrate. The limits on solution strength are, therefore, practical, the lower limit relating to excessive dilution and the upper limit relating to pore clogging on the substrate.

The wetted alumina substrate is next dried in a warm air system. It can be placed in a tumbling device, such as a turning tube, and tumbled very slowly in an atmosphere of relatively warm air for a few hours for drying. Tumbling at about 65.0° C. or greater for five hours has worked well to remove ninety-nine percent (99%) of the water. Drying is deemed to be adequately finished by evaporating a substantial portion of the water. Ideally, the potassium permanganate and water solution is applied to the substrate so that the dried, finished product has about four to five percent (4–5%), an optimum value being 4.5 percent, concentration of potassium permanganate by weight to the finished product. The product thus manufactured has an effective adsorptive capacity for ethylene gas per gram of finished material of about 30,000 microliters. This maximum value is defined by the limit which is achieved when the adsorptive power of the potassium permanganate is substantially limited, and, hence, the product thereafter may be deemed to be saturated and incapable of further adsorption. The adsorption that occurs in the alumina substrate after coating with potassium permanganate utilizes oxygen from the permanganate ion to chemically attack and thereby break down the ethylene. This, of course, is a chemical conversion process on the alumina substrate which is not reversible, and, accordingly, the oxidizing power of the permanganate is permanently depleted over a period of time.

Potassium permanganate is the ideal salt. In the alternative, other metallic salts can be used, but they have secondary value. Sodium and manganese salts can be used, but they do not have quite the efficiency of potassium salt, and they are ordinarily more expensive.

The second component used in the present apparatus is activated carbon, which is a granular material which is ground to the extent the mesh size is not less than 12-by-30 and is ideally about 4-by-14. It has a surface area of not less than about 1450.0 square meters per gram. This, of course, is an extremely fine particle. The function of this adsorbent is to attract certain precursors of ethylene, such as acetaldehyde and other complex gaseous hydrocarbons. The activated carbon adsorbs the precursors which, in some instances, remain in the near atmosphere and, if permitted, will assist in synthesization of the ethylene. The carbon further acts as a prescrub material to ethylene.

The present invention utilizes the two-component system described above which components are, in one instance, a finely ground particle or powder and, in the other instance, are large, granular pieces. The two are ideally stored in compartmentalized equipment separate from one another, yet in near proximity to permit the two to be used together. The ability to purify the air of gases of respiration near postharvest produce in synergistic in that the spectrum of materials removed from the atmosphere by the two together is not merely the sum of the spectrums removed by the materials when considered singly.

The present invention further utilizes additional adsorbents. Two inert adsorbents can be physically mixed together without adversely impacting their adsorption capacity. One is a molecular sieve which has a surface area of not less than about 350.0 square meters per gram which, in turn, can be obtained by using a sieve having a 4-by-8 mesh screen. Ideally, the molecular sieve is an activated sieve. The molecular sieve adsorbs carbon dioxide. It has particular benefit in protecting crops such as mushrooms. Mushrooms are susceptible to mold and fungi development which take place at relatively high levels of carbon dioxide in the atmosphere. One type of mold is verticillium and pseudomonas, and other decay which manifests itself as a surface slime developed thereon grow at relatively reduced oxygen concentration levels. Inevitably, an increase of carbon dioxide concentration is tied to a decrease in oxygen concentration. An activated molecular sieve for specifically adsorbing carbon dioxide will prevent this.

A second, chemically inert, mixable constituent is activated silica gel. Ideally, a silica gel having a surface area of not less than about 850.0 square meters per gram obtained from passing the gel through a mesh of 38–200 can be used with the carbon to suppress moisture content in the atmosphere. It has the capacity of adsorbing about thirty to forty percent (30–40%) of its weight in water vapor. At that level, the gel then becomes inactive.

In a recent test on mushrooms known as agaricus compestris, which mushrooms are comprised of about 89.5 percent water, a standard or average weight loss as a result of dehydration of about twenty to twenty-five percent (20–25%) was detected in control mushrooms. In the container for the control mushrooms, excessive fogging and condensation occurred. The fogging or condensation in conjunction with increased levels of carbon dioxide in that closed atmosphere created ideal conditions for the formation of bacterial spots, verticillium or pseudomonas development. Evidence of excessive slime was seen on the control mushrooms.

In the test mushrooms, during the same storage interval (twenty days), it was noted that the weight loss on the average was less than ten percent (10%). The adsorption of carbon dioxide thus implemented by the present invention left smaller amounts of bacterial spotting detected with only minimal slime build-up on the caps and stipes of the test lot of mushrooms. This test was conducted with silica gel and a molecular sieve as taught by this disclosure.

The present invention is not simply limited to edible fruits and vegetables. It is also quite successful with fresh cut flowers. In a test on freshly cut carnations of pink color, the following was noted. As to the four carnations, their stems were inserted into Erhlenmeyer flasks containing about 300.0 milliliters of water. Four cut carnations were inserted into eash flask. Ten lots each (forty carnations) were placed in a laboratory desiccator and another ten lots without the present invention were placed in another desiccator. Additionally, three bananas (cut into two parts) were placed in each desiccator. The present invention was placed in the test desiccator while it was not placed in the control desiccator. The desiccators were sealed and maintained at a temperature of twenty degrees C. According to documented sources, an ethylene concentration of 0.2 parts per million for an interval of about eighteen to twenty-four hours will induce senescense in carnations. Florists characterize this as sleepiness. Through the introduction of cut bananas, a source was assuredly provided which would evolve ethylene levels well in excess of the relatively modest level of 0.2 parts per million within each closed system. It is further noted that maintenance of the temperature at about twenty degrees C. assured ethylene diffusion and fairly rapid ethylene-induced hormonal changes within the plants.

While maintaining the specified temperature on the control and test desiccators, the flowers of the control group were observed to discolor and develop fungi (one fungus being Botrytis) and bacterial infection. By contrast, the test specimen flowers maintained good visual quality with an absence of decay.

Another test utilizing the present invention has shown the decayed maturation of pineapples, mangos and papayas. Again, two lots of produce were used, a test lot and a control sample lot. The present invention particularly achieved the desired result of inhibiting decay development. Pineapple is very susceptible to a fairly common disease known as fruitlet core rot which is a disease created by fusarium and which is a form of penicillum, but this disease was conclusively inhibited through the present invention. For mangos and papayas, another common disorder for these fruits, anthracnose, was totally arrested in the test lot. The control lot showed definite signs of anthracnose decay. It also showed signs of stem end decay, known as botryodiplodia or peduncle. A test of the fruit occurred in closed containers (standard shipping containers) operated at standard shipping temperatures and stocked with fruit which is stored and stacked in the standard manner. The duration was the duration required for a cruise from Central America where such fruits are available to Great Britain, a duration of twenty-eight days. Another control lot of fruit treated with a known fungicide (Benlate) has been tested, and a comparison showed notably less fungal development than the control lot. The control lot (treated with Benlate) displayed much more fungal development on inspection after the 28-day trip.

Another test or experiment was carried out under laboratory conditions to confirm the impact of the disclosed apparatus on inhibiting stem end decay, sometimes called crown rot, and delayed ripening of green bananas. The bananas used were clusters of green bananas of the Gros Michel variety. The test and control clusters were placed in sealable desiccators described earlier. The control lot omitted the present invention. The test endured for six days at a relatively high temperature of thirty degrees C., typical in a nonrefrigerated banana boat located in the Caribbean. The bananas protected by the present apparatus did not change color. The control bananas became yellow with some dark brown spotting, a type of spotting often referred to as sugar spotting, an accepted sign of fruit maturity. The treating lot not only maintained its green color, but maintained fruit firmness and tissue texture at least as observed and by hand test. Chlorophyll and sugar content in the banana rind and pulp at the conclusion of the test was determined. The chlorophyll content test involved the measure of the amount of chlorphyll in five grams of banana rind. The banana rind was extracted by mashing with 15.0 milliliters of an eighty percent (80%) aqueous acetone in a mortar. The same test, of course, was applied to the test lot and the control lot. In the untreated bananas, the chlorophyll content was 0.088 nanometers, while the treated bananas contained 0.168 nanometers, almost twice the measure of chlorophyll. Five grams of banana pulp for each lot were mashed with 25.0 milliliters of 80% aqueous ethanol in a mortar. The sugar content in the supernatant obtained from the resulting homogenate was determined by testing with a phenolsulphuric acid test method. The data yielded (with the O.D. at 485 nm.) was 2.300 nanometers, and the treated bananas had a sugar content of only 0.482 nanometers. As can be seen from this test, the ripened bananas had substantially turned to sugar. Further, a decay count of the two test banana groupings showed that crown rot or surface mold (a specific Latin name is not known) had been visibly retarded in the treated bananas, while the control bananas showed more mold development on visual inspection.

Similar responses have been obtained in other tests on produce such as tomatoes, squash, okra, strawberries, cantaloupes, lemons, limes, grapefruits, tangerines and others.

Mixing of the four constituents of the present invention thus should be considered. The permanganate impregnated alumina substrate should not be physically comingled with the activated carbon. There is no chemical reaction on mixing. However, it is believed that a ratio of 3:1 by weight of permanganate impregnated alumina to carbon is ideal. The molecular sieve and activated silica gel can be mixed together because they do not adversely interact with one another. They ideally have a ratio of 1:1. The molecular sieve and silica gel are present in equal portions. As an example, a small packet having three compartments hold the silica gel and molecular sieve in one compartment. Example volumes are 1.50 grams of silica gel, 1.50 grams of molecular sieve, 3.0 grams of carbon and 9.0 grams of impregnated alumina. The net result is that a three-component system is ideally devised. Ideally, all three components are exposed to air in the near atmosphere. These components thus provide a three-component system and, ideally, are utilized in a three-packet system. Through the use of porous filter paper having pore sizes sufficient for diffusion of water vapor and air through the filter paper, individual packets can be made which are illustrated in FIG. 1. FIG. 1 shows a packet where about 10.0 to 30.0 grams of product are located in each of the three sealed chambers of the packet. The sealing which is referred to is sealing of adjacent chambers to define the chambers as might be accomplished with the use of a heat sealer, adhesive or the like. The individual packets are identified by the numerals 11, 12 and 13, and the assembly as a whole is identified by the numeral 10. In other words, the seams which define the packets are transverse seams formed by a heat sealing mechanism. They isolate the material in the selected packets. The three packets 11, 12 and 13 are contiguous to one another. This permits them to sweep the airborne extractive materials in accordance with the present invention.

Figure 2:
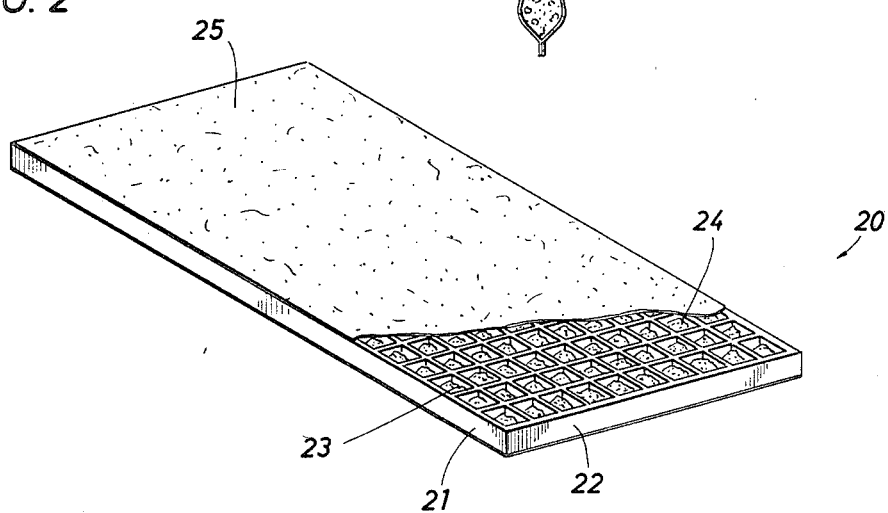
FIG. 2 is an alternate form of apparatus for holding ingredients in a grid framework with multiple pockets for different ingredients.

FIG. 2 shows an alternate embodiment. The embodiment in FIG. 2 is identified with the numeral 20. It is a thin, rectangular, grid framework defining individual compartments. It is open on the top and bottom. It thus includes a lengthwise side 21 and end wall 22 and a number of transverse walls 23. The walls 23 extend across both dimensions to define small compartments 24. The compartment 24 is closed over, top and bottom, by porous filter paper 25. The apparatus shown in FIG. 2 is preferably made of very lightweight, low quality, form plastic material. One form is styrofoam, but other plastics will serve quite readily. It is the type of material which ideally is thermoplastic so that exposure to a heated roller will soften the top edges of the frame members 21, 22 and 23. When they are softened, they then become sufficiently tacky to affix the paper film 25 placed over them. Thus, the apparatus is formed in the following manner. The open gridwork shown in FIG. 2 is first formed, all of compartments 24 being empty. It is passed over a heated roller or heated plate to thereby make the plastic material slightly tacky, and, while tacky, a filter paper bottom is applied to it. The filter paper is then held by the apparatus, and the individual compartments 24 have now been defined. The apparatus is then positioned beneath a filling device with the chambers 24 opened upwardly. The requisite number of chambers is filled somewhat loosely with the three components described above. A selected number of chambers is thus filled until all the chambers have been filled. Thereafter, the top of the plastic framework is again heated. At this juncture, it must be heated from above, as for example, by a removable, heated plate, a hot roller or the like. This makes the plastic tacky, and the tacky plastic material is then quickly touched against filter paper, the paper being firmly held on cooling. The paper is trimmed of any surplus, and the apparatus is then ready to use. Ideally, the chambers 24 are perhaps 1.0 to 3.0 centimeters tall, and their lateral dimensions are perhaps in the range of 1.0 to 5.0 centimeters. The product placed in them can be packed rather loosely and is filled on a loose granular basis to about forty to eighty percent. In other words, the filling is achieved by pouring the loose products without packing or tapping. The chambers are filled to the range of about forty to eighty percent. Filling tightly to one hundred percent of the capacity of each chamber creates problems because they may spill over from chamber to chamber and thereby cover over the top exposed edges of the frame members 21, 22 and 23. This is not desirable because the plastic material is preferably exposed to enable heating without interference with the granular product to be captured in the various containers.

Figure 3:
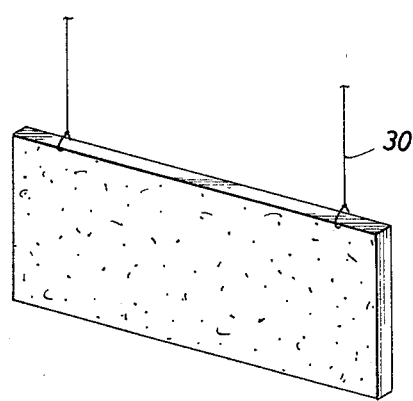
FIG. 3 discloses a mode of mounting the apparatus of FIG. 2 for purifying the air near produce.

FIG. 3 of the present invention discloses an additional tie string at 30 for suspending the apparatus shown in FIG. 2. If desired, one or two chambers can be left empty and the tie string punched through the filter paper to enable a loop and knot to be formed.

One limitation in the use of this invention is perishables packed in loose ice shavings. As an example, broccoli is often packed in finely shaved ice. This traditional mode of shipping places so much water in direct contact with the produce and in the near vicinity that it is not wise to use this invention. The excess water in contact with protective packets causes an undesirable bleeding effect on the permanganate which is at least unsightly and likely to stain both packet and produce.

As a matter of general information, the ideal concentration of ethylene, in parts per million, should be less than the following:
Apples: 1.0
Avocadoes: 1.0
Bananas: 1.0
Cantaloupes: 1.0
Strawberries: 1.0
Tomatoes: 1.0
Florals: 0.05

The foregoing is directed to the preferred embodiment, but the scope thereof is determined by the claims which follow.

I claim:
1. A container for retarding decay, maturation and senescense of perishables, including fruits, vegetables and florals, in postharvest circumstances which comprises:
   (a) an air-exposed first granulated adsorbent material having at least 350.0 square meters surface area per gram of material and having deposited thereon a permanganate salt for oxidation of airborne evolutionary gases from postharvest perishables;
   (b) an air-exposed second, adsorbent, granulated material having a surface area of not less than 1450.0 square meters per gram of material;
   (c) an air-exposed third adsorbent material in granulated form having a surface area of not less than 850.0 square meters per gram of material which material is a water-holding silica gel;
   (d) an air-exposed fourth adsorbent having a surface area of not less than 350.0 square meters per gram of material for removal of carbon dioxide from the evolutionary gases of fruit;
   (e) means for holding said first, second, third and fourth adsorbent, said means permitting air exposure of each of said adsorbents so that each of said air adsorbents is exposed to the near atmosphere;
   (f) wherein said first granulated adsorbent incorporates a granulated substrate in particulate form;
   (g) wherein said second adsorbent includes activated carbon in particulate form; and
   (h) wherein said fourth adsorbent includes a molecular sieve.

2. The container of claim 1 wherein said first and second adsorbent materials are physically separated.

3. The container of claim 2 including a porous material surrounding each of said adsorbents to permit air and airborne evolutionary gases from postharvest produce to pass therethrough.

4. The container of claim 1 wherein the first and second chemical adsorbing constituents are utilized in a 3:1 ratio by weight.

5. The container of claim 1 including a package means holding said four adsorbents with separate facilities for the first and second adsorbents.

6. The container of claim 1 wherein said permanganate is obtained from an aqueous solution of potassium permanganate.

7. The container of claim 6 wherein said potassium permanganate is deposited onto an aluminum oxide substrate.

8. A container in accordance with claim 1 including a framework of rigid material having a plurality of adsorbent receiving pockets therein, said rigid material having the form of a framework defining therewithin said pockets and which pockets are closed on at least one side thereof with a porous membrane confining said adsorbents in said pockets and which porous membrane passes water, carbon dioxide and evolutionary gases into said pockets for interaction with said adsorbents.

* * * * *